US012775573B2

(12) United States Patent
Attrazic et al.

(10) Patent No.: US 12,775,573 B2
(45) Date of Patent: Oct. 27, 2026

(54) HUMAN-MACHINE INTERFACE WITH A SECURE CONNECTION

(71) Applicants: SAFRAN ELECTRONICS & DEFENSE, Paris (FR); CROUZET, Valence (FR)

(72) Inventors: Yannick Ghislain Sébastien Xavier Attrazic, Moissy-Cramayel (FR); Albert Auphan, Moissy-Cramayel (FR); Hervé Carton, Valence (FR)

(73) Assignees: SAFRAN ELECTRONICS & DEFENSE, Paris (FR); CROUZET, Valence (FR)

( * ) Notice: Subject to any disclaimer, the term of this patent is extended or adjusted under 35 U.S.C. 154(b) by 0 days.

(21) Appl. No.: 19/134,206

(22) PCT Filed: Nov. 27, 2023

(86) PCT No.: PCT/FR2023/051853

§ 371 (c)(1),
(2) Date: May 29, 2025

(87) PCT Pub. No.: WO2024/121483

PCT Pub. Date: Jun. 13, 2024

(65) Prior Publication Data

US 2026/0010506 A1 Jan. 8, 2026

(30) Foreign Application Priority Data

Dec. 7, 2022 (FR) ...................................... 2212894

(51) Int. Cl.
*G06F 13/40* (2006.01)

(52) U.S. Cl.
CPC ........ *G06F 13/409* (2013.01); *G06F 2213/40* (2013.01)

(58) Field of Classification Search
CPC ... B64C 13/503; B64C 13/042; B60T 8/1703; B60T 8/325; G06F 13/409; G06F 2213/40

(Continued)

(56) References Cited

U.S. PATENT DOCUMENTS 9,227,608 B2 * 1/2016 Hill ........................ B60T 8/1703
10,663,930 B2 * 5/2020 Becker .............. H04L 12/40176

(Continued)

FOREIGN PATENT DOCUMENTS

EP 2261116 A2 12/2010
EP 2261116 A3 4/2017

OTHER PUBLICATIONS

International Application No. PCT/FR2023/051853, International Search Report and Written Opinion, Feb. 23, 2024, 14 pages (5 pages of English translation, 9 pages of original document).

*Primary Examiner* — Brian T Misiura

(74) *Attorney, Agent, or Firm* — Kilpatrick Townsend & Stockton LLP

(57) ABSTRACT

The invention relates to a human-machine interface, in particular for a vehicle or for a device, comprising at least one gripping element equipped with at least one signal-generating means, and a controller and a base for fastening and mobilizing the gripping element and allowing the passage of data connections, the gripping element incorporating at least two data concentrators each connected, at input, in parallel to at least one signal-generating means and connected, at output, to the controller via the base by way of at least one data bus.

11 Claims, 3 Drawing Sheets

(58) Field of Classification Search
USPC .......................................................... 710/305
See application file for complete search history.

(56) References Cited

U.S. PATENT DOCUMENTS

| | | | | |
|---|---|---|---|---|
| 2009/0312892 | A1 | 12/2009 | Mahoney et al. | |
| 2011/0168851 | A1* | 7/2011 | Cherepinsky | G05D 1/0858 244/223 |
| 2016/0325830 | A1* | 11/2016 | Waltner | B64D 25/00 |
| 2025/0361002 | A1* | 11/2025 | Roltgen | B64C 13/503 |

* cited by examiner

HUMAN-MACHINE INTERFACE WITH A SECURE CONNECTION

CROSS REFERENCE TO RELATED APPLICATIONS

This application is a U.S. national phase under 35 U.S.C. § 371 of International Patent Application No. PCT/FR2023/051853, filed on Nov. 27, 2023, which claims priority to French Patent Application No. 2212894, filed on Dec. 7, 2022, the entire contents of both of which are incorporated herein by reference.

TECHNICAL FIELD

The technical field of the invention is human-machine interfaces and more particularly such human-machine interfaces to be actuated by the hand of an operator.

PRIOR ART

A control handle is an element of a human-machine interface between a hand of an operator, such as a pilot, and an actuator of a vehicle or a device.

In addition to the X and Y tilt sensors, current control handles (also called grips) integrate buttons (single or multidirectional) or thumbwheels that are connected directly to the on-board computers via wired connections. Their number varies depending on the application. For applications on a helicopter-type aircraft, this number is relatively large (10 to 20 buttons) and can lead to more than 80 wires to be passed between the handle and said computers. In addition, depending on the level of operational safety required, each button may integrate several acquisition electrical circuits each requiring at least one pair of wires. Furthermore, some handles that require other functions, such as force measurement, light management, user identification, or diagnostics, require specific electrical connections, also increasing the number of wired connections.

An issue encountered is related to this multitude of on-board functions, requiring substantial wiring and a source of failures, but is also related to the integration of the handle in the human-machine interface accommodating it, especially in terms of cable routing problems and unnecessary stiffness with regard to handle movements.

There is a need for a control handle in a context of a steering stick with movable parts allowing the use of a plurality of buttons and sensors, associated, at least for some of them, with a redundant communication, comprising a backup communication and facilitating maintenance.

DESCRIPTION OF THE INVENTION

One object of the invention is a human-machine interface, especially for a vehicle or for a device, comprising at least one gripping element provided with at least one signal generation means, a controller, and a base ensuring the attachment and mobility of the gripping element as well as the passage of data connections. The gripping element integrates at least two data concentrators, each data concentrator being connected as an input in parallel to at least one signal generation means and connected as an output to the controller through the base via at least one data bus.

A signal generation means may be chosen from a tilt sensor of the gripping element relative to a rest position, a button, a multidirectional button, a force sensor, and a gripping sensor.

The human-machine interface may include at least one other computer or control means, each data bus being able to be connected, in addition to the controller, to said at least one other computer or control means.

The human-machine interface may include at least one means for checking the control handle, each connected as an output to the controller by an alternative data bus, each data bus being connected to said at least one means for checking the control handle, the means for checking the control handle being configured to transmit the data received from the data bus to the controller in addition to the functions for checking the control handle.

The human-machine interface described above may comprise at least one communication means connected as an input to at least one signal generation means in parallel with the connection to the data concentrators, each communication means being connected to the controller by a discrete connection.

The human-machine interface described above may comprise at least one communication means connected as an input to at least one signal generation means in parallel with the connection to the data concentrators, each communication means being connected to the controller by a communication bus.

A data concentrator may comprise a computational means and a communication means connected to the communication bus, the computational means being configured to control the communication means connected to the communication bus such that the transmitted messages have a predefined structure in which validity bits are associated with the bits associated with the signals of the signal generation means, the whole being structured in bytes each associated with a parity bit, each transmitted message being associated with a rolling code incremented at each transmission, the validity bits, the parity bits and the rolling code being configured so that a faulty character of the message can be detected upon reception.

A signal generation means can simultaneously transmit a so-called normally open signal, and a complementary so-called normally closed signal.

One object of the invention is also an aircraft comprising an interface as described above, wherein the controller is a flight control system.

BRIEF DESCRIPTION OF THE DRAWINGS

Other purposes, characteristics and advantages of the invention will become apparent upon reading the following description, provided solely as a non-limiting example and with reference to the appended drawings in which.

DETAILED DESCRIPTION

The human-machine interface according to the invention comprises a gripping element, especially a control handle (or "stick" or "grip"), provided with signal generation means and configured to control a vehicle, especially an aircraft, wherein the control handle is mechanically attached to the human-machine interface by a base, through which various electrical connection wires circulate.

The gripping element is connected through the base to a controller such as a Flight Control System (FCS) via data buses and data connections.

In some embodiments, especially for the human-machine interfaces provided with force feedback, the gripping element is also connected to at least one means for checking the control handle such as an IEU ("Inceptor Electronic Unit").

The signal generation means are chosen from a tilt sensor of the gripping element relative to a rest position, a button, multidirectional buttons, force sensors, gripping sensors, both in analogue and digital versions.

Information feedback systems may also be provided such as, for example, lighting systems of all or part of the gripping element, force feedback systems or haptic feedback systems.

The lighting systems of all or part of the gripping element indicate to the operator the activation of particular operating modes, or the consideration of specific controls.

The haptic feedback systems allow the communication of similar information through the vibration of all or part of the gripping element, possibly in the form of specific vibration patterns, similarly to haptic feedback on a smartphone.

For some gripping elements, self-test and identification functions are required. Such gripping elements are provided with a special purpose processor capable of transmitting identification or self-test information upon reception of a request. Such a request is especially received via the information feedback systems.

Figure 1:
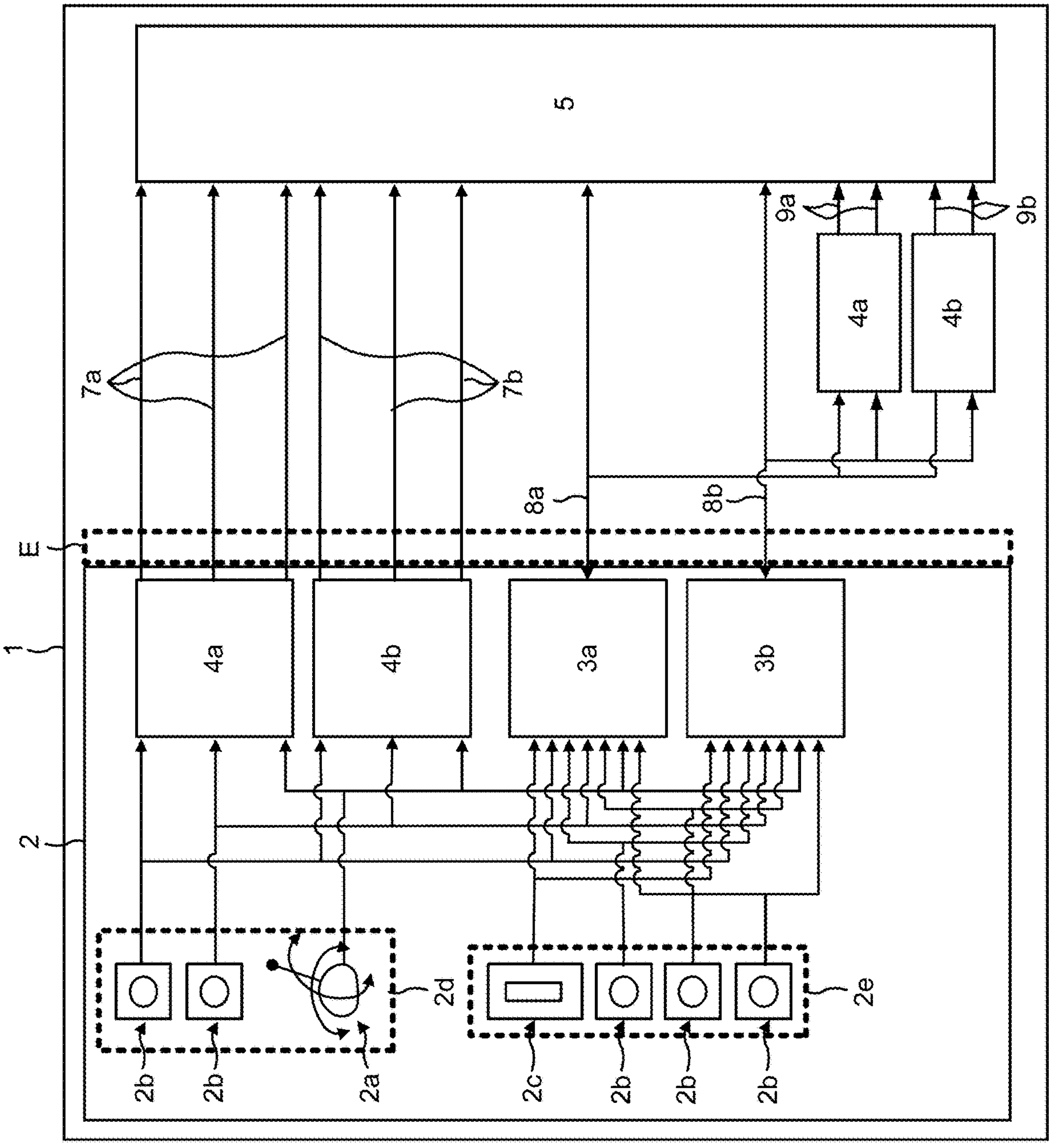
FIG. 1 illustrates the main elements of a first embodiment of a human-machine interface according to the invention.

In a first embodiment illustrated by FIG. 1, the human-machine interface 1 comprises at least one gripping element 2 provided with signal generation means such as tilt sensors 2*a*, buttons 2*b* and thumbwheels 2*c*. The signal generation means are each associated with one of at least one group 2*d* of critical functions and one group 2*e* of secure functions.

Group 2*d* of critical functions concerns all critical controls and systems for control integrity of the vehicle, especially of the aircraft. Without these functions, the operator can no longer steer the vehicle. The signal generation means associated with this group 2*d* of critical functions benefit from backup communication means in order to ensure that the signals generated will always be transmitted to the flight control system. In the example illustrated in FIG. 1, the group of critical functions 2*d* comprises tilt sensors 2*a*, and two buttons 2*b* disposed on the handle so that they can be actuated by the hand of the pilot. The critical functions associated with the buttons 2*b* are not necessarily related to piloting. The critical functions are associated with critical controls, defined by the aircraft manufacturer. Each aircraft manufacturer uses these buttons as suitable.

The ability to standardise the critical functions associated with the buttons 2*b* makes it possible to meet the needs of aircraft manufacturers, thus having a type of handle that can be preconfigured for each type of mission (for example, civil or military). It is then possible not to redefine the entire interface for each client.

It will be understood that these are only examples, which are non-limiting regarding the functions comprised in the group of critical functions.

Group 2*e* of secure functions comprises all other controls and systems. The loss of these functions would place the aircraft in a degraded operating mode but would not jeopardise its integrity. In the example illustrated in FIG. 1, the group of secure functions 2*e* comprises three buttons and a thumbwheel 2*e*. The secure controls and functions are defined by the aircraft manufacturer, at the application level. These are also non-limiting examples.

Each signal generated by one of the signal generation means, regardless of whether it belongs to the group of critical functions 2*d* or the group of secure functions 2*e*, is duplicated at the signal generation means, so that it is simultaneously transmitted to two data concentrators 3*a*, 3*b*.

The data concentrators 3*a*, 3*b* are disposed in the gripping element 2 upstream of the base and are each connected to a distinct data bus 8*a*, 8*b*. Each data bus 8*a*, 8*b* is connected through the base to a flight control system 5. The base is referenced E in FIGS. 1 and 2.

In a particular embodiment, the human-machine interface comprises IEUs 6*a*. 6*b* for managing some functions of the human-machine interface. In such a case, each IEU 6*a*, 6*b* is connected upstream to the data buses 8*a*, 8*b* and downstream to the flight control system 5 by at least one other respective data bus 9*a*, 9*b*. It will thus be understood that the data buses 8*a*, 8*b* make it possible to connect the data concentrators 3*a*, 3*b* to several computers without multiplying the connections. Each computer can thus have access to all data generated by the gripping elements and the signal generation means. Such a configuration is advantageous in the case of a modular architecture of the flight control system FCS 5. Each module of the flight control system FCS 5 connected to the data buses 8*a*, 8*b* thus benefits from access to all data.

The flight control system FCS 5 comprises processing and communication means, configured to perform the computations related to the flight model and the transmission of control requests of the actuators.

Thus, a data bus 8*a*, 8*b* respectively connects each data concentrator 3*a*, 3*b* to the flight control system 5 regardless of the number of signal generation means 2*a*, 2*b*, 2*c* connected to a communication means 4*a*. The data buses 8*a*, 8*b* are advantageously CAN type buses.

The signal generation means associated with the group of critical functions 2*d* are also connected to a communication means 4*a* having the function of shaping and conditioning the signals for transmission to the flight control system via a discrete connection. By discrete connection, it is meant a wired connection carrying the signals of a single signal generation means. It will be understood that a communication means 4*a* can be configured to process all signals transmitted by the signal generation means associated with the group of critical functions 2*d* by transmitting them to a discrete connection 7*a* dedicated to each signal. Alternatively, a plurality of communication means 4*a* may be provided. Each communication means 4*a* can be configured to process the signal transmitted by a signal generation means associated with the group of critical functions 2*d* by transmitting it to a discrete connection 7*a* dedicated to the signal processed. In this application case, two pluralities of communication means 4*a*, 4*b* are provided due to the duplication of each signal at the signal generation means. Each duplicated signal is simultaneously transmitted to the data concentrators 3*a*, 3*b* and the communication means 4*a*, 4*b*.

Each communication means 4*a*, 4*b* is connected to the flight control system 5 via discrete connections, respectively, 7*a*, 7*b*, such that a discrete connection connects each communication means 4*a*, 4*b* to the flight control system 5 for each signal generation means 2*a*, 2*b*, 2*c* connected to the communication means 4*a*, 4*b*.

Thus, it appears that the signals generated by the signal generation means associated with the group of critical functions 2*d* benefit from more transmission channels than the signals generated by the signal generation means associated with the group of secure functions 2*e*. These signals are transmitted via each of the data concentrators 3*a*, 3*b* and associated data buses 8*a*, 8*b*, and via the communication means 4*a*, 4*b* and duplicated discrete connections 7*a*, 7*b*. The dissimilarity in the transmission of these signals makes it possible to cover common mode failure cases.

It will be understood that the number of connections passing through the base disposed between the handle 2 and the flight control system 5 is all the more reduced as the number of signal generation means 2*a*, 2*b*, 2*c* connected to the data concentrators 3*a*, 3*b* is large and the number of discrete connections is reduced.

In the particular case of a human-machine interface provided with IEU, the signals generated by the signal generation means are also transmitted via the data concentrators 3*a*, 3*b*, the associated data buses 8*a*, 8*b*, the IEUs 6*a*, 6*b*, and the data buses 9*a*, 9*b* in addition to the transmission paths 3*a*, 3*b*, 4*a*, 4*b*. This transmission of signals generated by the signal generation means is carried out in addition to the specific functions of the IEUs, especially the management of the force feedback device control on the control handle. By way of illustration, a means for checking the control handle 6*a*, 6*b* receives as an input the signals transmitted by each of the concentrators 3*a*, 3*b*, and compares them so as to identify a discrepancy indicating a failure.

Thus, three paths are available for transmitting signals generated by signal generation means.

Figure 2:
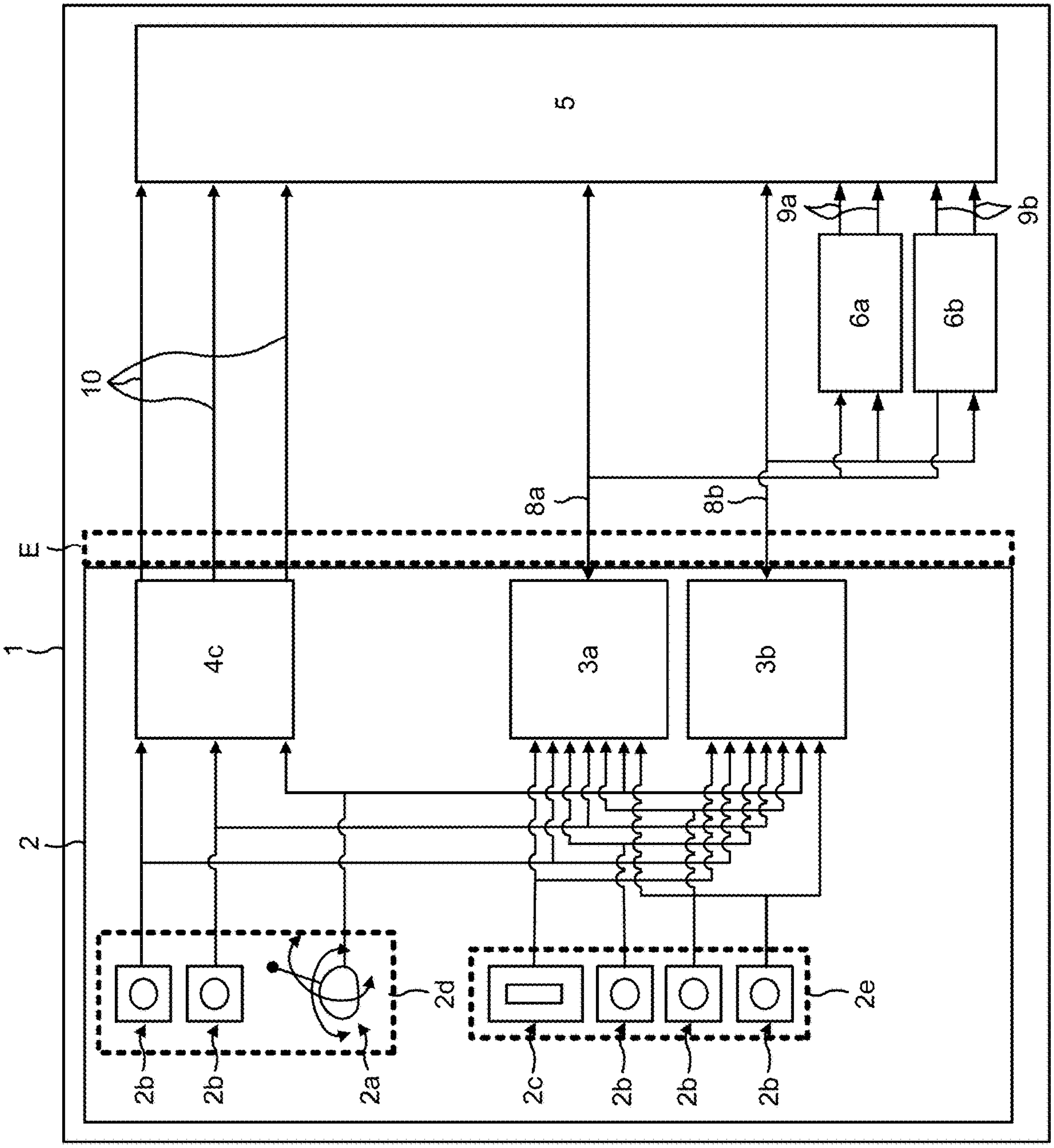
FIG. 2 illustrates the main elements of a second embodiment of a human-machine interface according to the invention.

FIG. 2 illustrates another embodiment, wherein the signal generation means comprised in the group 2*d* of critical functions and connected to the communication means 4*a* in the first embodiment illustrated by FIG. 1 are here connected to an alternative communication means 4*c* provided with a connection to another data bus 10, distinct from the data buses 8*a*, 8*b* between the data concentrators 3*a*, 3*b*, the IEUs 6*a*, 6*b* and the flight control system FCS 5 as well as alternative data buses between the IEUs 6*a*, 6*b* and the flight control system FCS 5.

This other data bus 10 makes it possible to further reduce the number of connections between the gripping element 2 and the flight control system FCS 5 while still benefiting from the ease of maintenance due to the use of data concentrators. For purposes of common mode failure coverage, the alternative communication means 4*c* may be of a dissimilar design.

Figure 3:
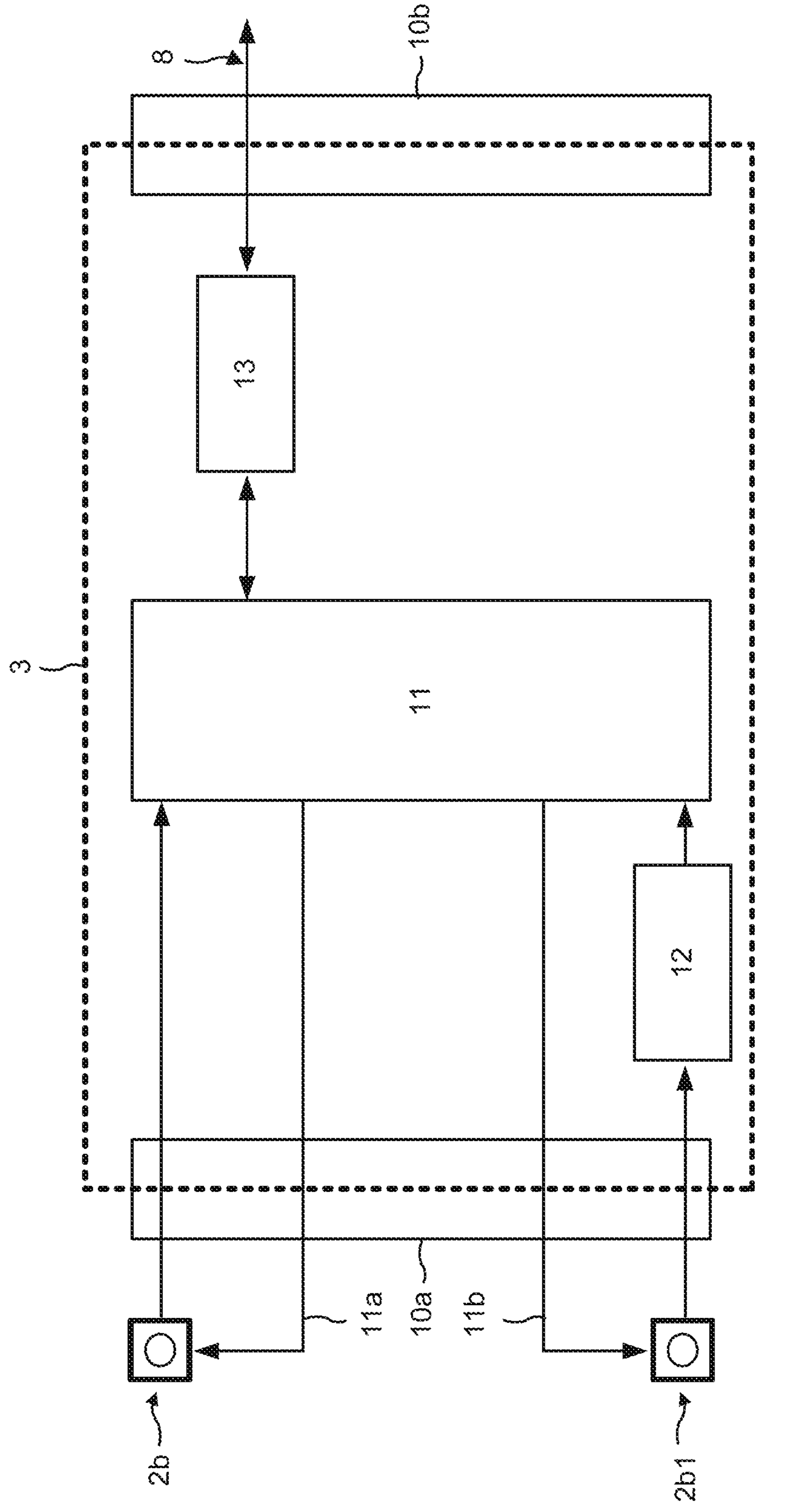
FIG. 3 illustrates the main elements of a data concentrator according to the invention.

FIG. 3 illustrates in more detail the structure of a data concentrator 3, 3*a*, 3*b* according to the first and second embodiments.

The data concentrator 3, 3*a*, 3*b* is connected on the one hand to each of the signal generation means (2*a*, 2*b*, 2*c*) through an input connector 10*a* and on the other hand to the data bus 8, 8*a*, 8*b* through an output connector 10*b*. It will be understood that an input connector 10*a* is provided by connection to a signal generation means. Alternatively, a single input connector 10*a* is provided with a plurality of connection points for connecting the signal generation means in a differentiated manner. Similarly, the output connector 10*b* may comprise a number of connection points adapted to the type of communication bus 8*a*, 8*b* chosen.

The data concentrator 3, 3*a*, 3*b* comprises a computational means 11, and a communication means 13. When the data concentrator 3, 3*a*, 3*b* is connected to an analogue signal generation means, it also comprises an analogue-to-digital conversion means 12.

The signal generation means illustrated as an example in FIG. 3 are a digital button 2*b* and an analogue button 2*b*1.

The digital button 2*b* is connected to a computational means 11 of the data concentrator 3, 3*a*, 3*b*. The analogue button 2*b*1 is connected to the same computational means 11 through an analogue-to-digital converter 12 of the data concentrator 3, 3*a*, 3*b*. The computational means 11 is connected to the data bus 8, 8*a*, 8*b* via communication means 13 of the data concentrator 3, 3*a*, 3*b*. The computational means 11 is any programmable or configurable or preconfigured processing means, such as for example a microprocessor or a controller of the FPGA ("Field Programmable Gate Array") type, or an ASIC.

It will be understood that the signal generation means 2*b*, 2*b*1 illustrated in FIG. 3 have been chosen only by way of example in order to illustrate the elements 11, 12, 13 of a data concentrator 3, 3*a*, 3*b*. Other signal generation means may be connected to a data concentrator, as illustrated in FIG. 1 or FIG. 2. It should be noted that the power supply of the data concentrator is not illustrated.

Finally, connections 11*a*, 11*b* make it possible to transmit an information feedback signal to the buttons 2*b*,2*b*1, such as lighting control, haptic feedback or information feedback, for example.

It is reminded that the lighting systems of all or part of the gripping element 2 make it possible to indicate to the operator the activation of particular operating modes, or the consideration of specific controls.

The haptic feedback systems enable the communication of similar information through the vibration of all or part of the gripping element 2, possibly in the form of specific vibration patterns, similarly to haptic feedback on a smartphone.

For some gripping elements 2, self-test and identification functions are required. Such gripping elements 2 are provided with a special purpose processor capable of transmitting identification or self-test information upon reception of a request. Such a request is especially received via the information feedback systems.

In addition to the redundancy of the transmission channels described in the embodiments above, the signals transmitted over the data buses 8*a*, 8*b* have a structure that makes it possible to add an additional level of security against errors. The structure of messages carried by the signals transmitted over a data bus is as follows.

A message transmitted over the data bus comprises words (or "bytes") each formed of the same number of bits (or "characters") which can take the value 0 or the value 1.

Each message comprises a predefined bit length and a predefined arrangement of bytes. Similarly, each byte comprises a predefined bit length and a predefined arrangement of bits.

The bits transmitted in each message comprise bits representing analogue values, referred to as analogue value bits, analogue validity bits, NO signal bits, NC signal bits, and digital validity bits described below. All of these bits are provisioned in a message for each of the signal generation means, regardless of their digital or analogue nature. The bits are initialised to a default value associated with the absence of a value. The bits concerning a signal generation means are overwritten by the values adapted during the formation of the message so that it is possible to determine, upon reception, the relevant values for each signal generation means. Parity bits of each byte are also comprised in each message.

Each signal generation means 2*a*, 2*c* of the analogue type (as opposed to digital) comprises an output the voltage or current of which is proportional to the action performed. This output voltage or current is digitised by an Analogue-to-Digital Converter (ADC). The digitised value is stored on several contiguous bits referred to as bits representing analogue values. For a check purpose, contiguous bits referred to as analogue validity bits are established based on the check of the validity and consistency of the acquired data, the check may comprise a consistency check over time (variability of the acquired values) or a check of extreme values with respect to a range of nominal values. All checks are configurable.

Each signal generation means 2*b* of the digital type (as opposed to analogue) comprises two outputs, one carrying a "Normally Open" signal called NO signal, the other carrying a complementary "Normally Closed" signal called NC signal.

The signals carried by these two outputs are therefore always opposite. The value of the NO signal is stored on an NO signal bit. Similarly, the value of the NC signal is stored on an NC signal bit.

A failure is then determined by an equivalence of the signals carried by these two outputs. To achieve this, a logical processing is applied to the signals carried by these two outputs in the form of an XOR ("OR EXCLUSIVE") logical gate associated with a timing of a predefined duration, for example 50 ms. Thus, if the two signals are strictly different for a duration greater than the predefined duration, a digital validity bit, associated with the signal generation means 2*b* having generated the NO/NC signals compared, is set to 1. If the two signals are identical, or if they are not strictly different for a duration longer than the predefined duration, the digital validity bit, associated with the signal generation means 2*b* having generated the NO/NC signals compared, is set to 0.

It should be noted that a physical device, such as a button, may comprise several actions, for example pressing and a toggling direction. Each action is then considered as a distinct signal generation means and associated with an NO signal and an NC signal.

A message transmitted over the data bus further comprises a multi-bit-coded rolling code. The rolling code is incremented by one unit after each transmission of a message.

Securing at the message is ensured by comparing the rolling code of a received message to the rolling code of the previous message. If the rolling code is different, the message is a new message, even if the values carried by the other bits of the message are unchanged compared to those of the previous message. This is the case when the human-machine interface is not requested by the operator. If the rolling code is identical, the message is identical to the previous message due to blocking of transmission means comprised in the data concentrator. A malfunction is then detected.

It is thus understood that the structure itself of the messages transmitted over a data bus is protected against errors at different levels of the transmission chain, by virtue of validity bits, parity bits and rolling codes.

The invention claimed is:

1. A human-machine interface, for a vehicle or for a device, comprising at least one gripping element provided with:

at least one signal generation means;

a controller;

a base ensuring the attachment and mobility of the gripping element as well as the passage of data connections, wherein the gripping element integrates at least two data concentrators, each data concentrator being connected as an input in parallel to at least one signal generation means and connected as an output to the controller through the base via at least one data bus; and at least two data buses, wherein each data bus is distinct from the other data buses and connects one of the data concentrators of the gripping element through the base to the controller regardless of the number of signal generation means integrated within the gripping element.

2. The human-machine interface according to claim 1, wherein a signal generation means is selected from a tilt sensor of the gripping element relative to a rest position, a button, a multidirectional button, a force sensor, and a gripping sensor.

3. The human-machine interface according to claim 1, including at least one other computer or control means, each data bus being connected, in addition to the controller, to said at least one other computer or control means.

4. The human-machine interface according to claim 3, including at least one means for checking the gripping element, each connected as an output to the controller by an alternative data bus, each data bus being connected to said at least one means for checking the gripping element, the means for checking the gripping element being configured to transmit the data received from the data bus to the controller in addition to the functions for checking the gripping element.

5. The human-machine interface according to claim 1, comprising at least one communication means connected as an input to at least one signal generation means in parallel with the connection to the data concentrators, each communication means being connected to the controller by a discrete connection.

6. The human-machine interface according to claim 1, comprising at least one communication means connected as an input to at least one signal generation means in parallel with the connection to the data concentrators, each communication means being connected to the controller by a communication bus.

7. The human-machine interface according to claim 1, wherein a data concentrator comprises a computational means and a communication means connected to the data bus, the computational means being configured to control the communication means connected to the data bus so that transmitted messages have a predefined structure in which validity bits are associated with bits associated with the signals of the signal generation means, the whole being structured in bytes each associated with a parity bit, each transmitted message being associated with a rolling code incremented at each transmission, the validity bits, the parity bits and the rolling code being configured so that a faulty character of the message can be detected upon reception.

8. The human-machine interface according to claim 7, wherein a signal generation means simultaneously transmits a so-called normally open signal, and a complementary so-called normally closed signal.

9. An aircraft comprising an interface according to claim 1, wherein the controller is a flight controller.

10. A human-machine interface, for a vehicle or for a device, comprising at least one gripping element provided with at least one signal generation means, a controller, and a base ensuring the attachment and mobility of the gripping element as well as the passage of data connections, wherein the gripping element integrates at least two data concentrators, each data concentrator being connected as an input in parallel to at least one signal generation means and connected as an output to the controller through the base via at least one data bus, the human-machine interface also comprising at least one communication means connected as an input to at least one signal generation means in parallel with the connection to the data concentrators, each communication means being connected to the controller by a discrete connection.

11. A human-machine interface, for a vehicle or for a device, comprising at least one gripping element provided with at least one signal generation means, a controller, and a base ensuring the attachment and mobility of the gripping element as well as the passage of data connections, wherein the gripping element integrates at least two data concentrators, each data concentrator being connected as an input in parallel to at least one signal generation means and connected as an output to the controller through the base via at least one data bus, a data concentrator comprises a computational means and a communication means connected to the communication bus, the computational means being configured to control the communication means connected to the communication bus so that transmitted messages have a predefined structure in which validity bits are associated with bits associated with the signals of the signal generation means, the whole being structured in bytes each associated with a parity bit, each transmitted message being associated with a rolling code incremented at each transmission, the validity bits, the parity bits and the rolling code being configured so that a faulty character of the message can be detected upon reception.

* * * * *